May 15, 1945.                M. LEVINE                2,376,144
                       REGULATING MECHANISM
                      Filed Jan. 17, 1944          2 Sheets-Sheet 1

Inventor:
Martin Levine,
by Harry E. Dunham
His Attorney.

May 15, 1945. M. LEVINE 2,376,144
REGULATING MECHANISM
Filed Jan. 17, 1944 2 Sheets-Sheet 2
Fig. 4.
Fig. 5.
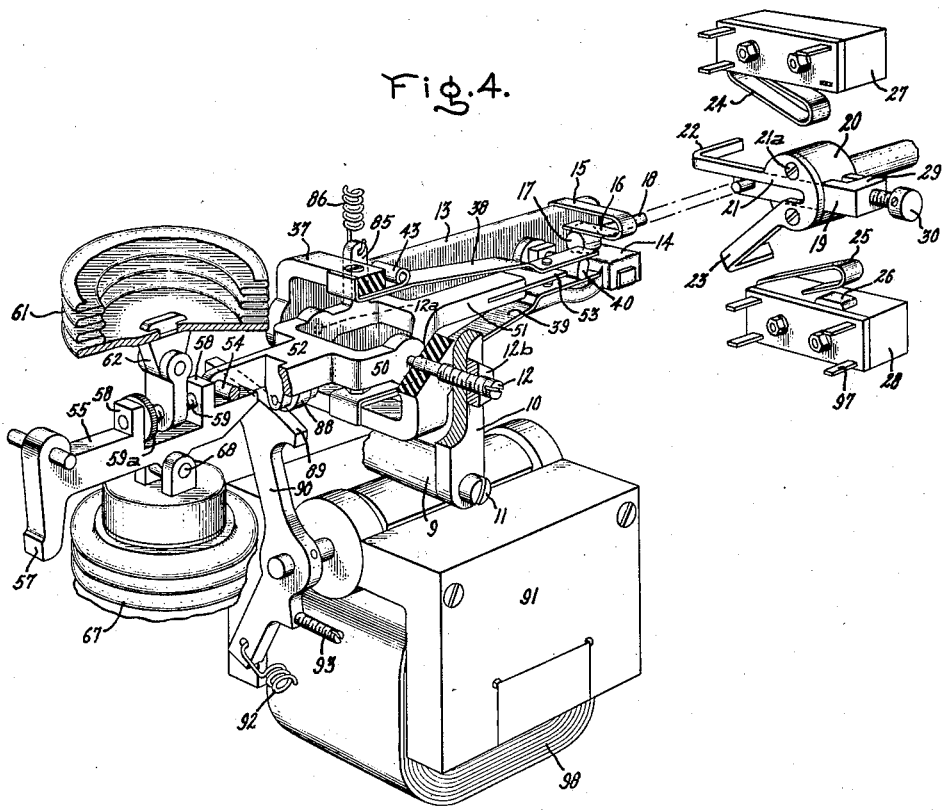
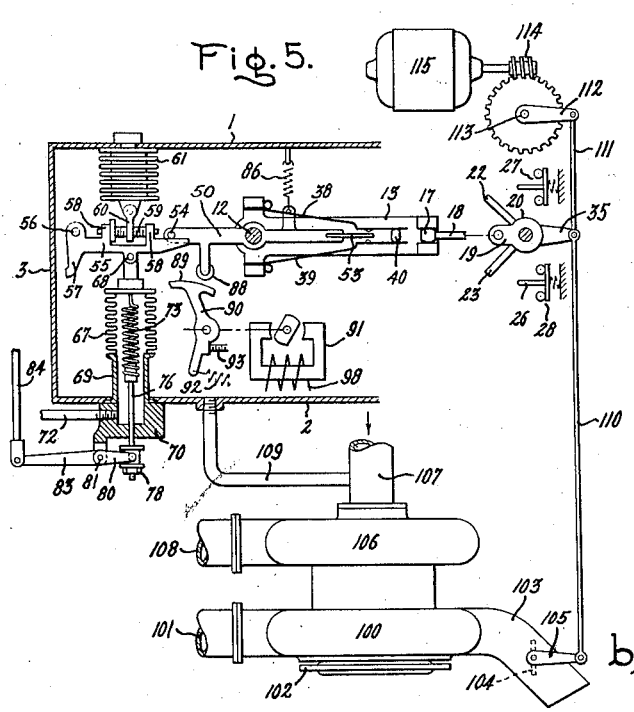
Inventor:
Martin Levine,
by Harry E. Dunham
His Attorney.

Patented May 15, 1945

2,376,144

UNITED STATES PATENT OFFICE 2,376,144

REGULATING MECHANISM

Martin Levine, Schenectady, N. Y., assignor to General Electric Company, a corporation of New York Application January 17, 1944, Serial No. 518,532

3 Claims. (Cl. 200—81.5)

The present invention relates to regulating mechanisms or governing mechanisms and particularly to such mechanisms which embody a follow-up mechanism to prevent hunting or unstable operation.

The invention is well adapted for use on aircraft as a regulator or governor for a control valve and it is this application of my invention which I have elected specifically to illustrate and describe. It is to be understood, however, that this is only by way of example and that the invention may be used wherever found applicable.

The object of my invention is to provide an improved construction and arrangement of regulating mechanism or governing mechanism, and for a consideration of what I believe to be novel and my invention, attention is directed to the following specification and to the claims appended thereto.

Figure 1:
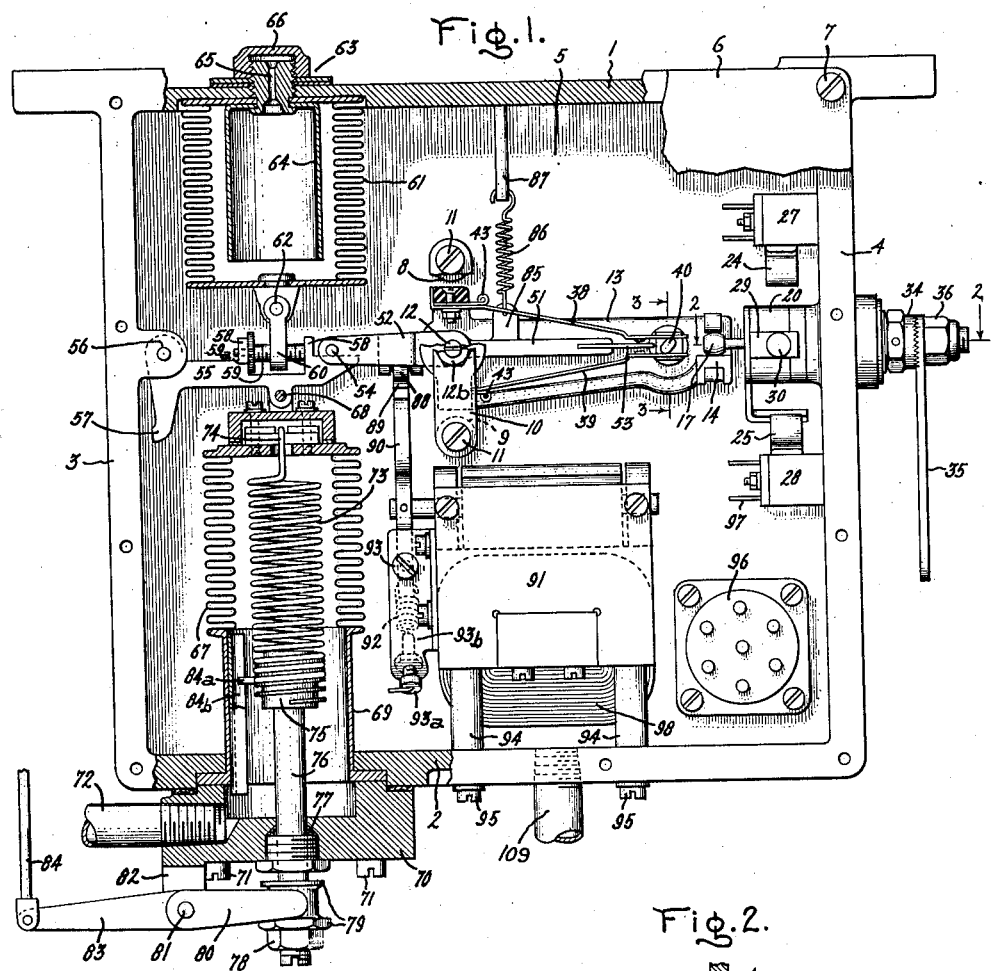
Figure 2:
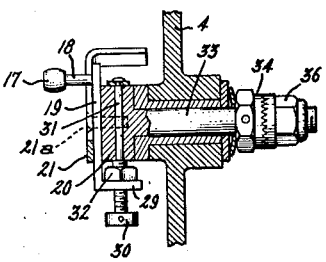
Figure 3:
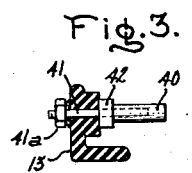

In the drawings, Fig. 1 is a view, partly in section, of a regulator or governor embodying my invention; Fig. 2 is a detail sectional view taken on line 2—2, Fig. 1; Fig. 3 is a detail sectional view taken on line 3—3, Fig. 1; Fig. 4 is a perspective view of a part of the mechanism with parts broken away and with the perspective as to certain elements distorted somewhat to better show the construction; and Fig. 5 is a diagrammatic view showing the application of the governor or regulator to the control valve of a turbo-supercharger for supercharging an aircraft engine. In Fig. 5 only sufficient mechanism is shown to illustrate an application of my invention. A regulator or governor embodying my invention may be used in connection with a regulating system such as that shown in the application of Hoffman & Crever, Serial No. 481,444, filed April 1, 1943, and assigned to the same assignee as the present application, or it may be used in connection with a system such as that shown in the application of Ridgley, Truesdell and Anderson, Serial No. 518,568 filed of even date herewith and assigned to the same assignee as the present application.

The mechanism is enclosed in a casing which for convenience of description may be considered as comprising a top wall 1, a bottom wall 2, end walls 3 and 4, and side walls 5 and 6. Side wall 6 is attached to the top, bottom and end walls by screws 7, thus forming the cover of the box.

Fixed to side wall 5 in vertically spaced relation to each other are two posts 8 and 9 to the ends of which is fastened a strap 10 by means of screws 11. Strap 10 is shown partly broken away in Fig. 4 and the upper post 9 has been omitted in order better to illustrate the structure. Adjustably mounted in strap 10 is a pivot pin 12 having two bearing surfaces, one of which is larger in diameter than the other, as shown particularly in Fig. 4, and carried by wall 5 directly opposite pivot pin 12 is a similar pivot pin 12$^a$. Pivot pin 12 is fixed in position by a lock nut 12$^b$. Pivotally mounted on the two pivot pins on the bearing surfaces of larger diameter is an arm 13 which for the most part is L-shaped in section, as shown particularly in Figs. 3 and 4. At its right-hand end it is provided with an enlarged portion 14 around which is wrapped a piece of suitable spring metal 15 which terminates at one end in a spring finger 16 located in spaced relation to the inner surface portion 14. Located between spring finger 16 and portion 14 is a head 17 on the end of a shaft 18, which shaft at its other end is fixed to one end of a flat crank arm 19 located in a transverse groove in the end of a head 20. It is held in the groove in head 20 by a disk 21 which is fixed to the head by screws 21$^a$ and which carries arms 22 and 23 having angularly extending ends adapted to engage spring straps 24 and 25 to bring such straps into engagement with operating buttons 26 of limit switches 27 and 28. The disk 21 is cut away between arms 22 and 23 to provide a slot through which shaft 18 extends. Crank arm 19 has an inturned end 29 provided with a tapped opening in which is located an adjusting screw 30, which screw is carried on the end of a pin 31 passing through and pivotally mounted in an opening in head 20 (Fig. 2). By turning screw 30, the effective length of crank arm 19, i. e., the position of ball 17 with respect to head 20, may be adjusted after which it can be locked in adjusted position by the set nut 32. Head 20 is carried by a shaft 33 pivoted in a bushing mounted in an opening in end wall 4. On the screw threaded outer end of shaft 33 is a nut which holds the shaft in place and which is provided with a toothed collar 34 with which engages a toothed portion on the inner end of an actuating arm 35, the parts being held in engagement by a nut 36. By loosening nut 36, the direction in which arm 35 extends relatively to crank arm 19 may be adjusted after which it may be locked in adjusted position by again tightening the nut 36. With the above described arrangement, it will be seen that when arm 35 is moved, head 20 is turned to effect turning movement of lever 13 on pivot pin 12.

At its left-hand end, lever 13 is in the form of a rectangular yoke 37 to the upper and lower arms of which are fixed spring contact strips 38 and 39. The free ends of contact strips 38 and 39 terminate in parallel portions provided with contact buttons; also, between such ends is located a head 40, oblong in cross section, and carried on the end of a shaft 41 pivotally mounted in an opening in lever 13 and held frictionally from turning by a spring washer and nut 41$^a$. By turning shaft 41, head 40 may be turned to adjust the distance apart at which stand the contact buttons on spring arms 38 and 39. The head 40 is provided with a squared portion 42 to receive a tool for turning the head when it is to be adjusted. Lever 13 is preferably made of suitable insulating material; or if not made of insulating material, then the contact strips 38 and 39 are suitably insulated with respect to it. Each contact strip embodies an eye 43 to which may be connected a lead wire for the electrical circuit in which the contacts are connected.

Mounted on the smaller diameter portions of the pivot pins is a contact arm 50 comprising a central rectangular portion and right- and left-hand end portions 51 and 52. The contact lever may be made of suitable conducting material so that it may be connected directly into an electrical circuit. The right-hand portion 51 comprises a contact strip 53 which stands between the contact buttons on spring arms 38 and 39 and is adapted to make contact with them. The left-hand portion 52 of the lever comprises a yoke, extending across and fixed in the free ends of which is a pin 54 which engages a flat surface on the free end of a lever arm 55 pivoted on ears projecting inwardly from end wall 3, as is indicated at 56. Lever arm 55 is provided with a downwardly projecting stop finger 57 which is adapted to engage end wall 3 to limit downward movement of the lever arm on its pivot. Lever arm 55 is provided with a pair of spaced ears 58 in which is rotatably mounted a threaded rod 59, it being provided with a knurled head 59a by means of which it may be turned. On threaded rod 59 is a traveling nut 60 having a pair of spaced ears to which is pivoted the movable end of a corrugated bellows 61, as is indicated at 62. The other end of bellows 61 is fixed rigidly to top casing wall 1 by means of a stud, as is indicated at 63. Inside the bellows is a stop sleeve 64 which is fixed to top wall 1 and serves to limit the collapsing movement of the bellows. In the stud which fastens the bellows to top wall 1 is an axially extending opening 65 normally closed by a cover cap 66. In use, bellows 61 is evacuated and the evacuation may be carried out through the opening 61, the opening then being sealed by cap 66.

Pivotally connected to lever arm 55 in opposed relation to bellows 61 is a second bellows 67, the upper or movable end of which is provided with spaced ears through which the bellows is pivotally connected to the lever by a suitable pin, as is indicated at 68. The lower or fixed end of bellows 67 is sealed to the upper end of a sleeve 69 fastened in an opening in bottom casing wall 2 by means of a cap 70 fixed in place by studs 71. Connected with cap 70 is a pipe line 72 through which a control pressure may be conveyed to the interior of bellows 67. Inside bellows 67 is a coiled tension spring 73, the upper end of which is connected to the top plate of the bellows, as is indicated at 74, and the lower end of which threads onto a head 75 on the upper end of a post 76 which projects out through a packing gland 77 in cap 70 and has on its threaded outer end a nut 78 provided with a pair of spaced annular shoulders 79. Engaged with the annular groove formed by shoulders 79 is a yoke on the end of an arm 80 fixed on one end of a shaft 81 pivoted in a pair of ears 82 depending from cap 70. Also, fixed on shaft 81 is an operating arm 83 to the free end of which may be connected a control rod 84 which extends to a suitable control lever (not shown). Movement of control rod 84 turns shaft 81 to lower and raise rod 76, the rod sliding through the packing gland 77. By this means, the tension of spring 73 can be adjusted. Also, the tension of spring 73 can be adjusted by turning rod 76 on its longitudinal axis, the end of the rod being provided with a notch, as shown, for the reception of a suitable tool for turning it. When turned, the threads on head 75 cause the turns of the spring 73 to be moved along the head, the spring being held from turning (and thus confined to axial movement only) by an end 84a of the spring which slides in a vertical groove 84b defined by a pair of spaced walls fastened to the inner surface of sleeve 69. On portion 51 of the contact lever is an upwardly projecting ear 85 to which is connected one end of a tension spring 86, the other end of which is connected to casing top wall 1 through the intermediary of a pin 87. Spring 86 serves to hold pin 54 normally in engagement with the flat surface of lever arm 55, and serves to make contact lever 50 follow the movements of lever arm 55. In substance it forms a yielding pivotal connection between contact lever 50 and lever arm 55.

Between two ears depending from the underside of lever portion 52 is mounted a roller 88 adapted to be engaged by a cam surface 89 carried by an arm 90 on the shaft of a torque motor 91. Arm 90 is biased to a position wherein cam surface 89 is spaced from the roller 88 by a spring 92 which holds a surface of the arm against an adjustable stop screw 93. Stop screw 93 and also an adjustable screw 93a for the one end of spring 92 are carried by a plate 93b fastened to the frame of the torque motor. The torque motor 91 is mounted on bottom casing wall 2 by means of posts 94 and studs 95.

At 96 is indicated an electrical connector comprising a number of contact pins carried in an insulating block fixed in side wall 5 of the casing. At 97 are indicated contacts through which electrical conductors may be connected to the limit switches 27 and 28. The winding of the torque motor is indicated at 98. A wiring diagram for the regulator is not shown in the drawings as the specific arrangement of the wiring system in which the regulator is used forms no part of the present invention.

In Fig. 5 is illustrated diagrammatically the regulator or governor connected to the control valve of a turbosupercharger, so much of the arrangement being illustrated as is needed for an understanding of my invention. Referring particularly to Fig. 5, the turbosupercharger is shown as comprising a gas turbine 100 to which gases, for example exhaust gases from an aircraft engine, may be conveyed by a conduit 101. The turbine wheel of the gas turbine is indicated at 102 and the waste conduit is indicated at 103. In waste conduit 103 is a suitable valve 104 on the shaft of which is fixed an operating arm 105. The compressor of the turbosupercharger is indicated at 106, the inlet conduit being indicated at 107 and the discharge conduit at 108. The inlet conduit 107 may have an inlet end which faces into the slip stream of the aircraft, as is well understood, and the discharge conduit may connect to the carburetor of the aircraft engine. Preferably, the casing of the regulator or governor has its interior connected to inlet conduit 107 by a pipe line 109 so that the pressure in the casing is the ram pressure, the ram pressure being somewhat higher than ambient pressure. However, the casing may be connected directly to atmosphere so that the pressure in it is ambient pressure, and it is to be understood that by the term ambient pressure as used in the claims, I mean either the surrounding atmospheric pressure or the so-termed ram pressure. Lever arm 105 is connected by a rod 110 to lever arm 35 which arm is connected also by a rod 111 to a lever arm 112 fixed on a shaft 113 connected through gearing 114 to a control motor 115. Motor 115 may be suitably connected into a control circuit which includes the contact arm 51, the spring contact strips 38 and 39, and the limit switches. As already pointed out, the specific circuit arrangement forms no part of my present invention and as such circuit arrangements are known, a circuit arrangement has not been illustrated in the drawings. For the purposes of the present invention, it is only necessary to note that when contact strip 53 on contact lever 50 engages one or the other of the contact buttons on spring contact arms 38 and 39, motor 115 is operated in one direction or the other to effect opening or closing movement of the valve 104. And that when valve 104 moves, head 20 is turned to effect turning movement of arm 13 in a direction to move away from contact strip 53 the control button with which it is in engagement. This latter forms a follow-up mechanism or restoring mechanism for the regulator or governor which serves to give it a certain width of regulation or droop to provide stability of control and prevent hunting of the regulator or governor. Pipe line 72 connects with the pressure to be controlled. This may be, for example, the intake manifold pressure of an aircraft engine, the pressure on the discharge side of the turbosupercharger compressor, or other pressure which is a measure of a function to be regulated, which pressure and function respond to adjustment of the waste valve 104.

The pressure conveyed through pipe line 72 to the interior of bellows 67 operates on the bellows in a direction to distend it in opposition to the tension of spring 73. Bellows 67 and 61 are arranged in opposed relation to each other and since bellows 61 is evacuated and both bellows are subjected on their exteriors to the same pressure, i. e., the pressure obtaining inside the casing, then variation in pressure in the casing tends to be equalized as to its effect on the bellows system. If the pressure in bellows 67 increases, the bellows is distended effecting movement of the leverage system to bring contact strip 53 on the end of contact arm 50 into engagement with the contact button or the lower contact strip 39 and this functions to effect operation of motor 115 to adjust valve 104 in a direction to cause that which is being controlled to restore the pressure conveyed through pipe line 72 to the interior of bellows 67 to a new value which will again bring the system into equilibrium with the contact strip 53 standing midway between the two contact buttons. Similarly, if the pressure in bellows 67 decreases, then spring 73 effects a collapsing movement of the bellows to effect operation of motor 115 in the opposite direction to move valve 104 to again restore the pressure to a value which will bring the system into equilibrium. In each instance, the follow-up mechanism operates in the manner already described.

The spring 73 may be set by control rod 84 for a certain pressure which it is desired to hold. It may be a pressure which is a measure of load on the aircraft engine and which is maintained by operation of the turbosupercharger. For the turbosupercharger to maintain such pressure, it may be required to operate at anywhere from light load to full load depending upon the altitude of the aircraft for as the aircraft altitude increases, the ambient pressure becomes less and less which means more and more work for the compressor to do since it must compress the air from ambient pressure to a pressure corresponding to that for which the regulator is set. And during this process, it will be clear that the pressure in the regulator casing will decrease as the altitude decreases.

As is known, a follow-up device as described has for its function to provide a certain width of regulation or pressure droop between light load and full load of the device being regulated, in the present instance a turbosupercharger, to give stability to the regulator and prevent hunting. This means that for any given setting of the regulator the pressure maintained at full load is a certain amount lower than at light load.

This difference in pressure between light load and full required to give stability of operation of the regulator may be objectionable in certain installations, it being desirable often to maintain more nearly a constant pressure irrespective of the load. According to one feature of my invention, I provide means for modifying or correcting for the inherent width of regulation of the regulator whereby more nearly constant pressure may be maintained over the entire load range of the regulator or governor. This result I accomplish in carrying out my invention by making either the pressure bellows 67 of less diameter than the evacuated bellows 61; by providing for bellows 67 a lever arm shorter than that of bellows 61, or by a combination of the two means. Preferably, I utilize a combination of the two means; and, as shown in the drawings, bellows 67 is of smaller diameter than bellows 61 and the length of the lever arm for bellows 61, i. e., the distance from its pivot pin 56 to nut 60, may be made greater than the length of the lever arm for bellows 67, i. e., the distance from its pivot point 56 to pivot connection 68.

Assume first that the lever arms for the two bellows are the same length but that the bellows 67 is smaller in diameter than the bellows 61. The torque resulting from the pull of each bellows on lever 51 is proportional to the respective areas of the bellows. Accordingly, as the pressure in the casing decreases with increase in altitude, (which means also increase in load on the turbosupercharger) the effective torque resulting from the pull of bellows 61 on the lever arm decreases more rapidly than does the effective torque resulting from the pull of bellows 67 on the lever arm whereby a proportionally higher pressure in bellows 67 will be required to reestablish a balanced condition of the two torques.

Assume now that the two bellows 61 and 67 are of the same diameter but that the lever arm of bellows 61 is longer than the lever arm of bellows 67. The torque resulting from the pull of each bellows on the lever arm is proportional the respective lengths of the lever arms. Accordingly, then here again, as the pressure in the casing decreases with increase in altitude (which means also increase in load on the supercharger) the effective torque resulting from the pull of bellows 61 on the lever arm decreases proportionately more rapidly than does the effective torque resulting from the pull of bellows 67 on the lever arm whereby again a proportionately higher pressure in bellows 67 will be required to reestablish a balanced condition of the two torques.

From the foregoing, it will be seen that the same result is obtained either by making bellows 61 larger in diameter than bellows 67 or by making the lever arm of bellows 61 longer than the lever arm of bellows 67. And either arrangement may be employed alone. Preferably, however, as shown in the drawings, I employ a combination of the two arrangements, making the bellows 61 larger in diameter than the bellows 67 by an amount to give the approximate desired modification in or correction for the normal width of regulation of the regulator and then adjusting the respective lengths of the two lever arms to give the exact desired modification in or correction for the normal width of regulation of the regulator. As shown in the drawings, the arrangement is such that the length of the lever arm of bellows 61 may be adjusted to be either greater than, equal to, or less than the length of the lever arm of bellows 67 thus providing for a range of adjustment of the width of regulation to either side of that set by the differential between the diameters of the two bellows.

In explanation of the functioning of the regulator, assume that the regulator apparatus is in operation on an aircraft; that at the then altitude of the aircraft, the turbosupercharger is operating at a speed to maintain in bellows 67 the control pressure for which the regulator is set by control rod 84, and that the parts are in equilibrium with contact strip 53 midway between the contact buttons on contact strips 38 and 39. Now assume that the aircraft climbs to a higher altitude. This means that the turbosupercharger must operate at a higher speed to hold the pressure for which the regulator is set. As the aircraft ascends, the supercharger at its then operating speed is no longer able to maintain the pressure for which the regulator is set. As a result, the pressure in bellows 67 decreases and this operates the regulator contacts to effect adjustment of valve 104 in a direction to increase the speed of the turbocharger in an effort to restore the pressure to a new value which will bring the regulator parts back into a position of equilibrium. By reason of the follow-up device, the new pressure required to bring the parts back into equilibrium would be a certain amount less than the previous pressure due to the width of regulation or droop of the governor. With increase in altitude, the pressure in the control casing decreases and this change in pressure in the control casing acts on the bellows system in a direction tending to increase the pressure required in bellows 67 to restore the regulator parts back to a position of equilibrium. Thus, two factors enter into the readjustment of the regulator; first, the follow-up device which tends to permit the regulator to assume a position of equilibrium at a pressure lower than that previously and, second, the bellows system which in substance acts in opposition to the follow-up mechanism and tends to require a pressure higher than that which would be required by the follow-up system alone in order to restore the regulator parts to equilibrium. Thus, the bellows system acts, so-to-speak, to correct for the width of regulation inherent in the follow-up mechanism. The follow-up mechanism functions first, it functioning along with the movement of the valve 104 while the bellows system functions afterwards as the pressure changes in the bellows 67 due to the change in the speed of the turbosupercharger. Thus, it may be considered that the follow-up mechanism operates first to set the control after which the bellows system operates to readjust the pressure so as to correct to a predetermined extent for the inherent width of regulation of the regulator.

It will be understood that the operation is the same when the aircraft decreases altitude except in the opposite sense.

Torque motor 91 functions as an overspeed device for the turbosupercharger, its winding 98 being connected in a suitable circuit associated with the turbosupercharger in a manner such that when the speed of the turbosupercharger exceeds a predetermined high value, cam 89 will be turned in a clockwise direction as viewed in Fig. 5, to bring the cam into engagement with roller 88 whereupon the torque motor takes control of movement of contact lever 50. Here again, the circuit arrangement utilized forms no part of my present invention and is not needed for a complete understanding of my invention. Accordingly, it has not been illustrated. An arrangement such as that disclosed in the aforementioned Hoffman and Crever application may be utilized.

What I claim as new and desire to secure by Letters Patent of the United States is:

1. As an article of manufacture, a regulator comprising a casing, a lever mechanism pivotally mounted in the casing, an evacuated bellows having one end fixed and the other end connected to the lever mechanism, a second bellows having one end fixed and the other end connected to said lever mechanism in opposed relation to the evacuated bellows, walls defining a passage which connects with the interior of said second bellows and through which it may be subjected to a control pressure, means for adjusting the lengths of the lever arms of said two bellows relatively to each other, said evacuated bellows being larger in diameter than the other bellows and conduit means communicating with the casing and arranged to subject the exterior of both bellows to a common pressure.

2. A regulator comprising a casing, a first contact lever pivoted in the casing, a second contact lever pivoted in the casing and having contacts adapted to be engaged by the first contact lever, said second contact lever being adapted to form a part of a follow-up mechanism for the regulator, a pair of bellows connected to said first contact lever in opposed relation to each other, one of said bellows being evacuated and the other having an opening through which a control pressure may be conducted to its interior, and means whereby the lengths of the lever arms of the bellows may be adjusted relatively to each other.

3. A regulator comprising a casing, a first contact lever pivoted in the casing, a second contact lever pivoted in the casing and having contacts adapted to be engaged by the first contact lever, said second contact lever being adapted to form a part of a follow-up mechanism for the regulator, a pair of bellows of unequal diameters connected to said first contact lever in opposed relation to each other, one of said bellows being evacuated and the other having an opening through which a control pressure may be conducted to its interior, and means whereby the length of the lever arms of the bellows may be adjusted relatively to each other.

MARTIN LEVINE.